(12) United States Patent
Nguyen (10) Patent No.: US 7,441,598 B2
(45) Date of Patent: Oct. 28, 2008

(54) METHODS OF STABILIZING UNCONSOLIDATED SUBTERRANEAN FORMATIONS

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/284,938

(22) Filed: Nov. 22, 2005

(65) Prior Publication Data

US 2007/0114022 A1     May 24, 2007

(51) Int. Cl.
  *E21B 33/13*     (2006.01)
  *E21B 43/26*     (2006.01)
(52) U.S. Cl. .................. 166/281; 166/250.1; 166/294; 166/297; 166/308.1
(58) Field of Classification Search .................. None
  See application file for complete search history.

(56) References Cited

U.S. PATENT DOCUMENTS

| | | | |
|---|---|---|---|
| 2,863,832 A | 12/1958 | Perrine | |
| 2,910,436 A | 10/1959 | Fatt et al. | |
| 3,215,199 A | 11/1965 | Dilgren | |
| 3,251,415 A | 5/1966 | Bombardieri et al. | |
| 3,307,630 A | 3/1967 | Dilgren et al. | |
| 3,297,090 A | 10/1967 | Dilgren | |
| 3,382,924 A | 5/1968 | Veley et al. | |
| 3,434,971 A | 3/1969 | Atkins | |
| 3,441,085 A | 4/1969 | Gidley | |
| 3,451,818 A | 6/1969 | Wareham | |
| 3,744,566 A | 7/1973 | Szabo et al. | |
| 3,910,862 A | 10/1975 | Barabas et al. | |
| 4,042,032 A * | 8/1977 | Anderson et al. | ........... 166/276 |
| 4,070,865 A * | 1/1978 | McLaughlin | ................ 405/264 |
| 4,129,183 A | 12/1978 | Kalfoglou | |

(Continued)

FOREIGN PATENT DOCUMENTS

DE        2 250 552        4/1974

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May. 21-22, pp. 1-2, printed from website @ http://speonline.spe.org/cgi-bin/viewpaper.cgi?paper=00068973.pdf.

(Continued)

*Primary Examiner*—Zakiya W. Baates
*Assistant Examiner*—Angela M DiTrani
(74) *Attorney, Agent, or Firm*—Robert A. Kent; Baker Botts LLP (57) ABSTRACT

Methods of stabilizing unconsolidated portions of a subterranean formation are provided. In one embodiment, the methods comprise: creating or enhancing at least two slots in an unconsolidated portion of a subterranean formation along a well bore, wherein the slots are positioned about 180 degrees from each other along the inner surface of the well bore; introducing a consolidating agent into the slots in the unconsolidated portion of the subterranean formation; and creating or enhancing at least one fracture in a portion of the subterranean formation.

15 Claims, 2 Drawing Sheets

U.S. PATENT DOCUMENTS

| | | |
|---|---|---|
| 4,142,595 A | 3/1979 | Anderson et al. |
| 4,158,521 A | 6/1979 | Anderson et al. |
| 4,158,726 A | 6/1979 | Kamada et al. |
| 4,299,710 A | 11/1981 | Dupre et al. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,393,939 A | 7/1983 | Smith et al. |
| 4,395,340 A | 7/1983 | McLaughlin |
| 4,401,789 A | 8/1983 | Gideon |
| 4,439,334 A | 3/1984 | Borchardt |
| 4,440,649 A | 4/1984 | Loftin et al. |
| 4,447,342 A | 5/1984 | Borchardt et al. |
| 4,460,627 A | 7/1984 | Weaver et al. |
| 4,462,718 A | 7/1984 | McLaughlin et al. |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,554,081 A | 11/1985 | Borchardt et al. |
| 4,563,292 A | 1/1986 | Borchardt |
| 4,604,216 A | 8/1986 | Irvin et al. |
| 4,627,926 A | 12/1986 | Peiffer et al. |
| 4,670,501 A | 6/1987 | Dymond et al. |
| 4,671,883 A | 6/1987 | Connell |
| 4,693,639 A | 9/1987 | Hollenbeak et al. |
| 4,699,722 A | 10/1987 | Dymond et al. |
| 4,730,028 A | 3/1988 | Bock et al. |
| 4,828,726 A | 5/1989 | Himes et al. |
| 4,864,864 A | 9/1989 | Yale et al. |
| 4,959,432 A | 9/1990 | Fan et al. |
| 5,058,676 A * | 10/1991 | Fitzpatrick et al. .......... 166/278 |
| 5,071,934 A | 12/1991 | Peiffer |
| 5,097,904 A | 3/1992 | Himes |
| 5,128,390 A * | 7/1992 | Murphey et al. ............ 523/130 |
| 5,146,986 A | 9/1992 | Dalrymple |
| 5,160,642 A | 11/1992 | Schield et al. |
| 5,165,475 A * | 11/1992 | Strubhar et al. ............. 166/276 |
| 5,197,544 A | 3/1993 | Himes |
| 5,208,216 A | 5/1993 | Williamson et al. |
| 5,244,042 A | 9/1993 | Dovan et al. |
| 5,249,627 A | 10/1993 | Harms et al. |
| 5,271,466 A | 12/1993 | Harms |
| 5,318,123 A | 6/1994 | Venditto et al. |
| 5,335,724 A | 8/1994 | Venditto et al. |
| 5,342,530 A | 8/1994 | Aften et al. |
| 5,361,856 A | 11/1994 | Surjaatmadja et al. |
| 5,379,841 A | 1/1995 | Pusch et al. |
| 5,382,371 A | 1/1995 | Stahl et al. |
| 5,494,103 A | 2/1996 | Surjaatmadja et al. |
| 5,547,023 A | 8/1996 | McDaniel et al. |
| 5,597,783 A | 1/1997 | Audibert et al. |
| 5,607,902 A | 3/1997 | Smith et al. |
| 5,637,556 A | 6/1997 | Argillier et al. |
| 5,646,093 A | 7/1997 | Dino |
| 5,669,456 A | 9/1997 | Audibert et al. |
| 5,720,347 A | 2/1998 | Audibert et al. |
| 5,728,653 A | 3/1998 | Audibert et al. |
| 5,735,349 A | 4/1998 | Dawson et al. |
| 5,765,642 A | 6/1998 | Surjaatmadja |
| 5,791,415 A * | 8/1998 | Nguyen et al. ........... 166/280.1 |
| 5,833,000 A | 11/1998 | Weaver et al. |
| 5,839,510 A | 11/1998 | Weaver et al. |
| 5,853,048 A | 12/1998 | Weaver et al. |
| 5,887,653 A | 3/1999 | Bishop et al. |
| 5,944,106 A | 8/1999 | Dalrymple et al. |
| 5,972,848 A | 10/1999 | Audibert et al. |
| 5,979,557 A | 11/1999 | Card et al. |
| 6,020,289 A | 2/2000 | Dymond |
| 6,070,664 A | 6/2000 | Dalrymple et al. |
| 6,124,245 A | 9/2000 | Patel |
| 6,187,839 B1 | 2/2001 | Eoff et al. |
| 6,228,812 B1 | 5/2001 | Dawson et al. |
| 6,237,687 B1 | 5/2001 | Barbee, Jr. et al. |
| 6,253,851 B1 | 7/2001 | Schroeder Jr, et al. |
| 6,277,900 B1 | 8/2001 | Oswald et al. |
| 6,283,210 B1 | 9/2001 | Soliman et al. |
| 6,311,773 B1 | 11/2001 | Todd et al. |
| 6,359,047 B1 | 3/2002 | Thieu et al. |
| 6,364,016 B1 | 4/2002 | Dalrymple et al. |
| 6,380,137 B1 | 4/2002 | Heier et al. |
| 6,439,309 B1 | 8/2002 | Matherly et al. |
| 6,450,260 B1 * | 9/2002 | James et al. ................ 166/277 |
| 6,476,169 B1 | 11/2002 | Eoff et al. |
| 6,476,283 B1 | 11/2002 | Devore et al. |
| 6,497,283 B1 | 12/2002 | Eoff et al. |
| 6,516,885 B1 | 2/2003 | Munday |
| 6,569,983 B1 | 5/2003 | Treybig et al. |
| 6,609,578 B2 | 8/2003 | Patel et al. |
| 6,710,107 B2 | 3/2004 | Audibert et al. |
| 6,732,800 B2 * | 5/2004 | Acock et al. ................ 166/295 |
| 6,776,236 B1 * | 8/2004 | Nguyen ...................... 166/279 |
| 6,787,506 B2 | 9/2004 | Blair et al. |
| 6,803,348 B2 | 10/2004 | Jones et al. |
| 2002/0070020 A1 * | 6/2002 | Nguyen ...................... 166/295 |
| 2003/0019627 A1 | 1/2003 | Qu et al. |
| 2003/0191030 A1 | 10/2003 | Blair et al. |
| 2004/0045712 A1 | 3/2004 | Eoff et al. |
| 2004/0102331 A1 | 5/2004 | Chan et al. |
| 2004/0171495 A1 | 9/2004 | Zamora et al. |
| 2004/0220058 A1 | 11/2004 | Eoff et al. |
| 2004/0229756 A1 | 11/2004 | Eoff et al. |
| 2004/0229757 A1 | 11/2004 | Eoff et al. |
| 2004/0256099 A1 | 12/2004 | Nguyen et al. |
| 2005/0000694 A1 | 1/2005 | Dalrymple et al. |
| 2005/0230116 A1 | 10/2005 | Eoff et al. |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2 335 428 A | 9/1999 |
| WO | WO 93/15164 | 8/1993 |
| WO | WO 99/49183 | 9/1999 |
| WO | WO 99/50530 | 10/1999 |
| WO | WO 02/097236 A1 | 12/2002 |
| WO | WO 2004/101706 A1 | 11/2004 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production,* 2002 Halliburton, pp. 1-2, printed from website @ www.halliburton.com/news/archive/2001/esgnws 053101.jsp?printMe.

Halliburton, 2001 Press Releases, *First Halliburton H2Zero™ Conformance Solution Job Performed for a Producing Well in Egypt,* 2002 Halliburton, pp. 1-2, printed from website @ www.halliburton.com/news/archive/2001/esgnws 111901.jsp.

Halliburton, 2001 Press Releases, *Halliburton Performs First H2Zero™ Conformance Solution Job in North America,* 2002 Halliburton, pp. 1-2, printed from website @ www.halliburton.com/news/archive/2001/esgnws 082201.jsp.

BJ Services Company, *Aquacon, Product Information,* Aug. 1, 2001, pp. 1-2.

BJ Services Company, *Aquatrol I, Product Information,* Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy,* SPE 64650, 2000, Society of Petroleum Engineers Inc., presented at the SPE International Oil and Gas Conference and Exhibition in China held in Beijing, China, Nov. 7-10, 2000, printed from website @ http://speonline.spe.org.

Proett, et al., *Advanced Permeability and Anisotropy Measurements While Testing and Sampling in Real-time Using a Dual Probe Formation Tester,* SPE 62919, 2000, Society of Petroleum Engineers Inc., presented at the 2000 SPE Annual Technical Conference and Exhibition held in Dallas, Texas, Oct. 1-4, 2000, printed from website @ http://speonline.spe.org.

Bai, et al., *Improved Determination of Stress-Dependent Permeability for Anisotropic Formations,* SPE/ISRM 78188, 2000, Society of Petroleum Engineers Inc., presented at the SPE/ISRM Rock Mechanics Conference held in Irving, Texas, Oct. 20-23, 2002, printed from website @ http://speonline.spe.org.

Parker, et al., *Laser Drilling: Effects of Beam Application Methods on Improving Rock Removal,* SPE 84353, 2003, Society of Petroleum Engineers Inc., presented at the SPE Annual Technical Conference and Exhibition held in Denver, Colorado, Oct. 5-8, 2003, printed from website @ http://speonline.spe.org.

Xu, et al., *Modeling of Laser Spallation Drilling of Rocks for Gas—and Oilwell Drilling,* SPE 95746, 2005, Society of Petroleum Engineers Inc., presented at the 2005 SPE Annual Technical Conference and Exhibition held in Dallas, Texas, Oct. 9-12, 2005, printed from website @ http://speonline.spe.org.

Batarseh, et al., *Well Perforation Using High-Power Lasers,* SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.

Gahan, et al., *Analysis of Efficient High-Power Fiber Lasers for Well Perforation,* SPE 90661, 2004, Society of Petroleum Engineers Inc., presented at the SPE Annual Technical Conference and Exhibition held in Houston, Texas, Sep. 26-29, 2004, printed from website @ http://speonline.spe.org.

Gahan, et al., *Effect of Downhole Pressure Conditions on High-Power Laser Perforation,* SPE 97093, 2005, Society of Petroleum Engineers, presented at the 2005 SPE Annual Technical Conference and Exhibition held in Dallas, Texas, Oct. 9-12, 2005, printed from website @ http://speonline.spe.org.

* cited by examiner

METHODS OF STABILIZING UNCONSOLIDATED SUBTERRANEAN FORMATIONS

BACKGROUND

The present invention relates to methods and compositions for treating subterranean formations. More particularly, the present invention relates to methods of stabilizing unconsolidated portions of a subterranean formation.

Hydrocarbon wells are often located in subterranean formations that contain unconsolidated particulates (e.g., sand, gravel, proppant, fines, etc.) that may migrate out of the subterranean formation into a well bore and/or may be produced with the oil, gas, water, and/or other fluids produced by the well. The presence of such particulates, in produced fluids is undesirable in that the particulates may abrade pumping and other producing equipment and/or reduce the production of desired fluids from the well. Moreover, particulates that have migrated into a well bore (e.g., inside the casing and/or perforations in a cased hole), among other things, may clog portions of the well bore, hindering the production of desired fluids from the well. The term "unconsolidated particulates," and derivatives thereof, is defined herein to include loose particulates and particulates bonded with insufficient bond strength to withstand the forces created by the flow of fluids through the formation, which may cause the particulates to shift or migrate within in the formation and/or into voids therein. Unconsolidated particulates may comprise, among other things, sand, gravel, fines and/or proppant particulates in the subterranean formation, for example, proppant particulates placed in the subterranean formation in the course of a fracturing or gravel-packing operation. The terms "unconsolidated subterranean formation," "unconsolidated portion of a subterranean formation," and derivatives thereof are defined herein to include any formation that contains unconsolidated particulates, as that term is defined herein. "Unconsolidated subterranean formations," and "unconsolidated portions of a subterranean formation," as those terms are used herein, include subterranean fractures wherein unconsolidated particulates reside within the open space of the fracture (e.g., forming a proppant pack within the fracture).

One method of controlling unconsolidated particulates in subterranean formations involves placing a filtration bed containing gravel (e.g., a "gravel pack") near the well bore to present a physical barrier to the transport of unconsolidated particulates with the production of desired fluids. Typically, such "gravel-packing operations" involve the pumping and placement of a quantity of certain particulate into the unconsolidated subterranean formation in an area adjacent to a well bore. One common type of gravel-packing operation involves placing a screen in the well bore and packing the surrounding annulus between the screen and the well bore with gravel of a specific size designed to prevent the passage of formation sand. The screen is generally a filter assembly used to retain the gravel placed during the gravel-pack operation. A wide range of sizes and screen configurations are available to suit the characteristics of the gravel-pack sand used. Similarly, a wide range of sizes of gravel is available to suit the characteristics of the unconsolidated particulates in the subterranean formation. To install the gravel pack, the gravel is carried to the formation in the form of a slurry by mixing the gravel with a fluid, which is usually viscosified. Once the gravel is placed in the well bore, the viscosity of the treatment fluid may be reduced, and it is returned to the surface. The resulting structure presents a barrier to migrating sand from the formation while still permitting fluid flow.

However, the use of such gravel-packing methods may be problematic. For example, gravel packs may be time consuming and expensive to install. Due to the time and expense needed, it is sometimes desirable to place a screen without the gravel. Even in circumstances in which it is practical to place a screen without gravel, however, it is often difficult to determine an appropriate screen size to use as formation sands tend to have a wide distribution of grain sizes. When small quantities of sand are allowed to flow through a screen, formation erosion becomes a significant concern. As a result, the placement of gravel as well as the screen is often necessary to assure that the formation sands are controlled. Expandable sand screens have been developed and implemented in recent years. As part of the installation, an expandable sand screen may be expanded against the well bore, cased hole, or open hole for sand control purposes without the need for a gravel-packing. However, expandable screens may still exhibit such problems as screen erosion and screen plugging.

Another method used to control particulates in unconsolidated formations involves consolidating unconsolidated particulates into stable, permeable masses by applying a consolidating agent (e.g., a resin or tackifying agent) to the subterranean formation. The particulates in these stable, permeable masses may be bonded with sufficient bond strength to withstand the forces created by the flow of fluids through the formation and/or prevented from shifting or migrating, but may still permit the flow of fluid(s) through the pore spaces of the mass. This is usually accomplished by preflushing the unconsolidated portion of the formation, applying a hardenable resin composition, applying a spacer fluid, applying an external catalyst to cause the resin to set, and applying an afterflush fluid to remove excess resin from the pore spaces of that portion of the formation. However, conventional consolidation techniques have often resulted in limited or inadequate penetration distances of consolidating agent, preflush fluids, afterflush fluids, and/or other components used in the treatment into the formation.

SUMMARY

The present invention relates to methods and compositions for treating subterranean formations. More particularly, the present invention relates to methods of stabilizing unconsolidated portions of a subterranean formation.

In one embodiment, the present invention provides a method comprising: creating or enhancing at least two slots in an unconsolidated portion of a subterranean formation along a well bore, wherein the slots are positioned about 180 degrees from each other along the inner surface of the well bore; introducing a consolidating agent into the slots in the unconsolidated portion of the subterranean formation; and creating or enhancing at least one fracture in a portion of the subterranean formation.

In another embodiment, the present invention provides a method comprising: introducing a consolidating agent into at least two pre-formed slots in an unconsolidated portion of a subterranean formation along a well bore, wherein the slots are positioned about 180 degrees from each other along the inner surface of the well bore; and creating or enhancing at least one fracture in a portion of the subterranean formation.

In another embodiment, the present invention provides a method comprising: determining the direction of maximum horizontal stress of an unconsolidated portion of a subterranean formation along a well bore; creating or enhancing at least two slots in the unconsolidated portion of the subterranean formation along the well bore, wherein the slots penetrate the subterranean formation in a direction approximately parallel to the direction of maximum horizontal stress of the unconsolidated portion of the subterranean formation, and wherein the slots are positioned about 180 degrees from each other along the inner surface of the well bore; introducing a consolidating agent into at least one slot in the unconsolidated portion of the subterranean formation; and creating or enhancing at least one fracture in a portion of the subterranean formation.

The features and advantages of the present invention will be readily apparent to those skilled in the art upon a reading of the description of the preferred embodiments that follows.

BRIEF DESCRIPTION OF THE DRAWINGS

These drawings illustrate certain aspects of some of the embodiments of the present invention and should not be used to limit or define the invention.

DESCRIPTION OF PREFERRED EMBODIMENTS

The present invention relates to methods and compositions for treating subterranean formations. More particularly, the present invention relates to methods of stabilizing unconsolidated portions of a subterranean formation.

I. Methods of the Present Invention

The methods of the present invention comprise introducing a consolidating agent into at least two slots in the unconsolidated portion of a subterranean formation along a well bore, creating or enhancing at least one fracture in a portion of the subterranean formation. The term "slot," as used herein, refers to any perforation, channel, pore, or passage that allows fluid communication between the well bore and a portion of the subterranean formation. A "slot," as that term is used herein, may be naturally-occurring, or it may be created or enhanced in the course of a subterranean treatment or operation performed prior to and/or during the course of a method of the present invention. The terms "consolidate," "consolidating," and derivatives thereof, are defined herein to include any process of stabilizing a portion of the subterranean formation, which may, at least in part, stabilize unconsolidated particulates such that they are bonded with sufficient bond strength to withstand the forces created by the flow of fluids through the formation and/or prevented from shifting or migrating. The term "consolidating agent" is defined herein to include any substance that may stabilize a portion of the subterranean formation, which may, at least in part, consolidate unconsolidated particulate, as that term is defined herein.

The methods of the present invention may be used to stabilize an unconsolidated portion of a subterranean formation such that the consolidating agent and/or other components introduced into the subterranean formation may penetrate more deeply into the subterranean formation, as compared to the penetration that may be achieved using consolidation methods known in the art. This enhanced penetration distance may, among other things, enhance the productivity of a well penetrating that subterranean formation and/or prevent the flowback of particulate materials (e.g., sand, formation fines, proppant particulates, etc.). Moreover, the methods of the present invention may be used to stabilize an unconsolidated portion of a subterranean formation without the necessity of a gravel-pack or screen.

The subterranean formations treated in the methods of the present invention may be any subterranean formation wherein at least a plurality of unconsolidated particulates resides in the formation. These unconsolidated particulates may comprise, among other things, sand, gravel, fines and/or proppant particulates within the open space of one or more fractures in the subterranean formation (e.g., unconsolidated proppant particulates that form a proppant pack within the fracture). Proppant particulates may be comprised of any material suitable for use in subterranean operations. Examples include, but are not limited to, sand, bauxite, ceramic materials, glass materials (e.g., glass beads), polymer materials, polytetrafluoroethylene(TEFLON®) materials, nut shell pieces, seed shell pieces, cured resinous particulates comprising nut shell pieces, cured resinous particulates comprising seed shell pieces, fruit pit pieces, cured resinous particulates comprising fruit pit pieces, wood, composite particulates, and combinations thereof. Composite particulates also may be used, wherein suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, ground nut/seed shells or husks, saw dust, ground cellulose fiber, and combinations thereof. Typically, the particulates have a size in the range of from about 2 to about 400 mesh, U.S. Sieve Series. In particular embodiments, particulates size distribution ranges are one or more of 6/12 mesh, 8/16, 12/20, 16/30, 20/40, 30/50, 40/60, 40/70, or 50/70 mesh. It should be understood that the term "particulate," as used in this disclosure, includes all known shapes of materials including substantially spherical materials, fibrous materials, polygonal materials (such as cubic materials) and mixtures thereof. Moreover, fibrous materials that may be used, inter alia, to bear the pressure of a closed fracture, are often included. In some embodiments, the proppant particulates may be coated with any suitable resin or tackifying agent known to those of ordinary skill in the art.

A well bore penetrating the subterranean formation being treated may contain one or more pipes or casing strings (e.g., a "cased" or "partially cased" well bore). In certain embodiments, the well bore may be uncased. In those embodiments where the portion of the well bore penetrating the portion of the subterranean formation being treated is cased or partially cased, perforations or holes may be created in the casing that allow fluid communication between the interior of the casing and formation(s) outside the casing. In certain embodiments, the slots in the unconsolidated portion of the subterranean formation may be created or enhanced in the methods of the present invention by directing a fluid and/or a tool through these perforations or holes in the casing. The perforations or holes in the casing may be made by any suitable means known in the art. In certain embodiments, these perforations or holes may be present in the casing before it is placed in the well bore. In certain embodiments, the perforations or holes in the casing may be created using the same tool or method used to create or enhance the slots in the unconsolidated portion of the subterranean formation, for example, by using a hydrajetting technique (described below). In other embodiments, the perforations or holes may be created using some other method or apparatus prior to or during the course of conducting a method of the present invention. In certain embodiments, particulates residing in the perforations or holes in the casing may be displaced by the consolidating agent (or the fluid comprising the consolidating agent), which may, inter alia, enhance or restore the flow of fluid through those perforations or holes in the casing.

The methods of the present invention optionally may comprise the step of isolating a particular region in the well bore (e.g., a region of the well bore adjacent to an unconsolidated portion of the subterranean formation), among other purposes, so as to selectively place the consolidating agent and/or other substances in a particular portion of the subterranean formation. Any method or tool known in the art for isolating a particular region in well bore may be used. For example, any static diverting agent or tool (e.g., chemicals, fluids, particulates or equipment) that is capable of diverting the flow of fluid away from a particular portion of a subterranean formation to another portion of the subterranean formation may be used. Examples of suitable static diverting agents include, but are not limited to fluids (e.g., aqueous-base and/or non-aqueous-base fluids), emulsions, gels, foams, degradable materials (e.g., polyesters, orthoesters, poly(orthoesters), polyanhydrides, dehydrated organic and/or inorganic compounds), particulates, packers (e.g., pinpoint packers and selective injection packers), ball sealers, pack-off devices, particulates, sand plugs, bridge plugs, and the like. A person skilled in the art, with the benefit of this disclosure, will recognize when a particular region in the well bore should be isolated in a method of the present invention, as well as the appropriate tool or method to accomplish this isolation.

The two or more "slots" are created or enhanced in an unconsolidated portion of a subterranean formation along a well bore. The presence of the slots in the subterranean formation may, inter alia, allow the consolidating agent and/or other components to penetrate more deeply into the subterranean formation, as compared to the penetration that may be achieved in consolidation methods known in the art. The presence of the slots in the methods of the present invention also may initiate the creation or enhancement of one or more fractures in the subterranean formation, which may increase the effective permeability of the formation (e.g., to increase the production of desired fluids from the formation).

Figure 1:
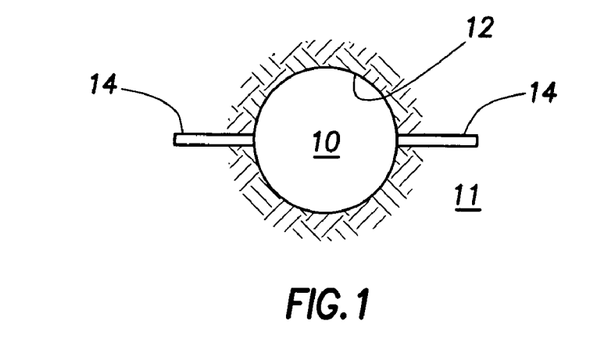
FIG. 1 shows a cross-sectional view of a subterranean formation penetrated by a well bore in one embodiment of the present invention.

The slots are generally present (or created) in the unconsolidated portion of the subterranean formation along the well bore at positions that are about 180 degrees from each other along the circumference of the inner surface of the well bore, which is sometimes referred to as a "bi-wing" configuration. This bi-wing configuration may, inter alia, reduce tortuosity, reduce near-well bore friction, and/or reduce the potential of multiple near well bore fractures. FIG. 1 illustrates a cross-sectional view of a well bore 10 with two slots 14 in communication with the well bore 10 penetrating the subterranean formation 11 at positions that are about 180 degrees from each other along the circumference of the inner surface 12 of the well bore 10 in a "bi-wing" configuration according to one embodiment of the present invention. In certain embodiments, the slots may have a length of at least about 1 inch. In certain embodiments, the slots may have a width in the range of from about 0.25 inches to about 1 inch.

The slots may be created or enhanced in the unconsolidated portion of the subterranean formation along the well bore in the methods of the present invention by any means known by a person skilled in the art. In some embodiments of the present invention, two or more slots may be created or enhanced using "hydrajetting" techniques. As used herein, the term "hydrajetting," and derivatives thereof, are defined herein to include the use of any method or tool wherein a fluid (e.g., a liquid or a gas) is propelled at a surface inside a subterranean formation so as to erode at least a portion of that surface. This erosion may occur due to, inter alia, mechanical erosion and/or chemical erosion (e.g., acidizing, dissolving, corroding, etc.) performed by one or more components of the fluid. In certain embodiments, hydrajetting techniques may comprise propelling a fluid comprising abrasive materials (e.g., particulate materials such as sand, gravel, degradable particulates, and the like) and/or propelling a fluid at a sufficiently high pressure at the surface inside the subterranean formation so as to erode at least a portion of that surface. Examples of suitable hydrajetting tools and hydrajetting methods are described in U.S. Pat. Nos. 5,765,642, 5,494, 103, and 5,361,856, 5,335,724, and 5,547,623 and U.S. Patent Application Publication Nos. 2004/0256099, the relevant portions of which are herein incorporated by reference. Examples of other methods that may be used to create or enhance slots in the unconsolidated portion of the subterranean formation include, but are not limited to, pinpoint stimulation techniques, pressure pulse techniques, perforating techniques (e.g., techniques used to create perforations in casing cemented in a well bore, including lasers of all types, explosive charges, perforating guns, and the like), and other similar practices known in the art.

In certain embodiments, the methods of the present invention may be used in "anisotropic formations," a term that, as used herein, describes the stress contrast, orientation or direction of the stresses in the formations. In addition to the overburden stress, which is the vertical stress (e.g., the weight of the formation above), a maximum and a minimum horizontal stress are also present. In certain embodiments of the present invention, the direction of the maximum horizontal stress in the formation may be determined using any method for making that determination known in the art. For example, the direction of maximum horizontal stress may be determined by observing the direction in which a test fracture propagates in the subterranean formation, which will be parallel to the direction of maximum horizontal stress. Examples of other methods of making this determination include the methods described in U.S. Pat. Nos. 5,335,724, 5,318,123 and 4,864, 864, the relevant disclosures of which are herein incorporated by reference. The direction of maximum horizontal stress also may be determined by observing or determining the direction of greatest permeability in the formation, which may be related to and used to determine the direction of maximum horizontal stress.

After the direction of maximum horizontal stress is determined, two or more slots may be created or enhanced such that the slots penetrate the subterranean formation in a direction that is approximately parallel to the direction of maximum horizontal stress. As used herein, the phrase "approximately parallel" is defined to include any direction that is within about 30 degrees of the reference direction. In certain embodiments, the slots may penetrate the subterranean formation in a direction that is within about 15 degrees of the direction of maximum horizontal stress.

The methods of the present invention optionally may include providing and introducing one or more preflush fluids into the subterranean formation at any point prior to, during, or subsequent to performing the methods of the present invention. Typically, injection of a preflush fluid may occur at any time before the consolidating agent is introduced into the slot in the unconsolidated portion of the subterranean formation. In certain embodiments, a preflush fluid may be used, among other purposes, to clean out undesirable substances (e.g., oil, residue, or debris) from the pore spaces in the subterranean formation, to clean out such undesirable substances residing in perforations or holes in a casing string, and/or to prepare the subterranean formation for subsequent placement of the consolidating agent. For example, an acidic preflush fluid may be introduced into at least a portion of the subterranean formation that may, inter alia, dissolve undesirable substances in the subterranean formation. The preflush fluid may be introduced into the slot in the unconsolidated portion of the subterranean formation through a hydrajetting tool, pumped directly into a well bore penetrating the subterranean formation from the surface, or introduced into the subterranean formation by any other suitable means. Generally, the volume of the preflush fluid used is between 0.1 times to 50 times the volume of the consolidating agent. Examples of preflush fluids suitable for use with the present invention are described in more detail in Section II. below.

Figure 2:
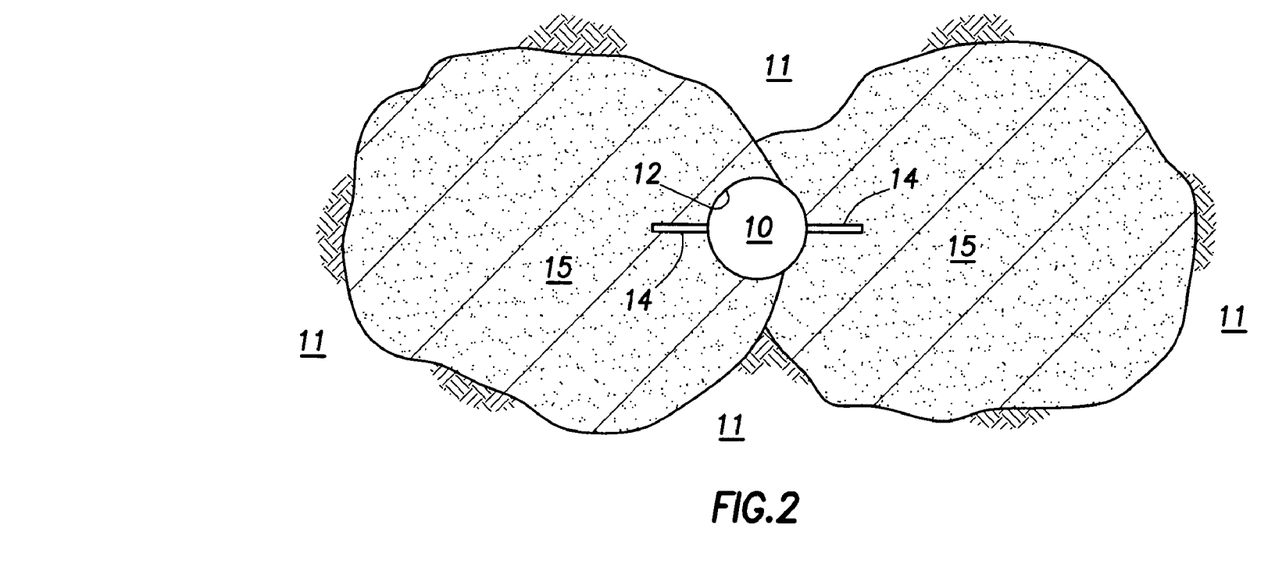
FIG. 2 shows a cross-sectional view of a subterranean formation penetrated by a well bore after a consolidating agent has been introduced according to one embodiment of the present invention.

FIG. 2 illustrates a cross-sectional view of the well bore 10 depicted in FIG. 1 after the consolidating agent 15 has been introduced into the slots 14 penetrating the subterranean formation 11. In certain embodiments, the consolidating agent may penetrate deeply into the formation due to, inter alia, the presence and placement of the slots in the subterranean formation. The consolidating agent may be introduced into two or more slots in the subterranean formation by any means known in the art. In certain embodiments, the consolidating agent may be introduced into two or more slots in the subterranean formation by pumping the consolidating agent into a well bore penetrating the subterranean formation from the surface. In certain embodiments, the consolidating agent may be introduced into two or more slots in the subterranean formation through a tool that is capable of directing the flow of a fluid into the subterranean formation (e.g., a hydrajetting tool). The consolidating agent also may be selectively placed in a slot in the subterranean formation by using a diverting agent or tool (e.g., chemicals, fluids, particulates or equipment) to divert the flow of fluid into the particular slot(s). Examples of suitable diverting agents include, but are not limited to fluids (e.g., aqueous-base and/or non-aqueous-base fluids), emulsions, gels, foams, degradable materials (e.g., polyesters, orthoesters, poly(orthoesters), polyanhydrides, dehydrated organic and/or inorganic compounds), particulates, packers (e.g., pinpoint packers and selective injection packers), ball sealers, pack-off devices, particulates, sand plugs, bridge plugs and the like.

Figure 3:
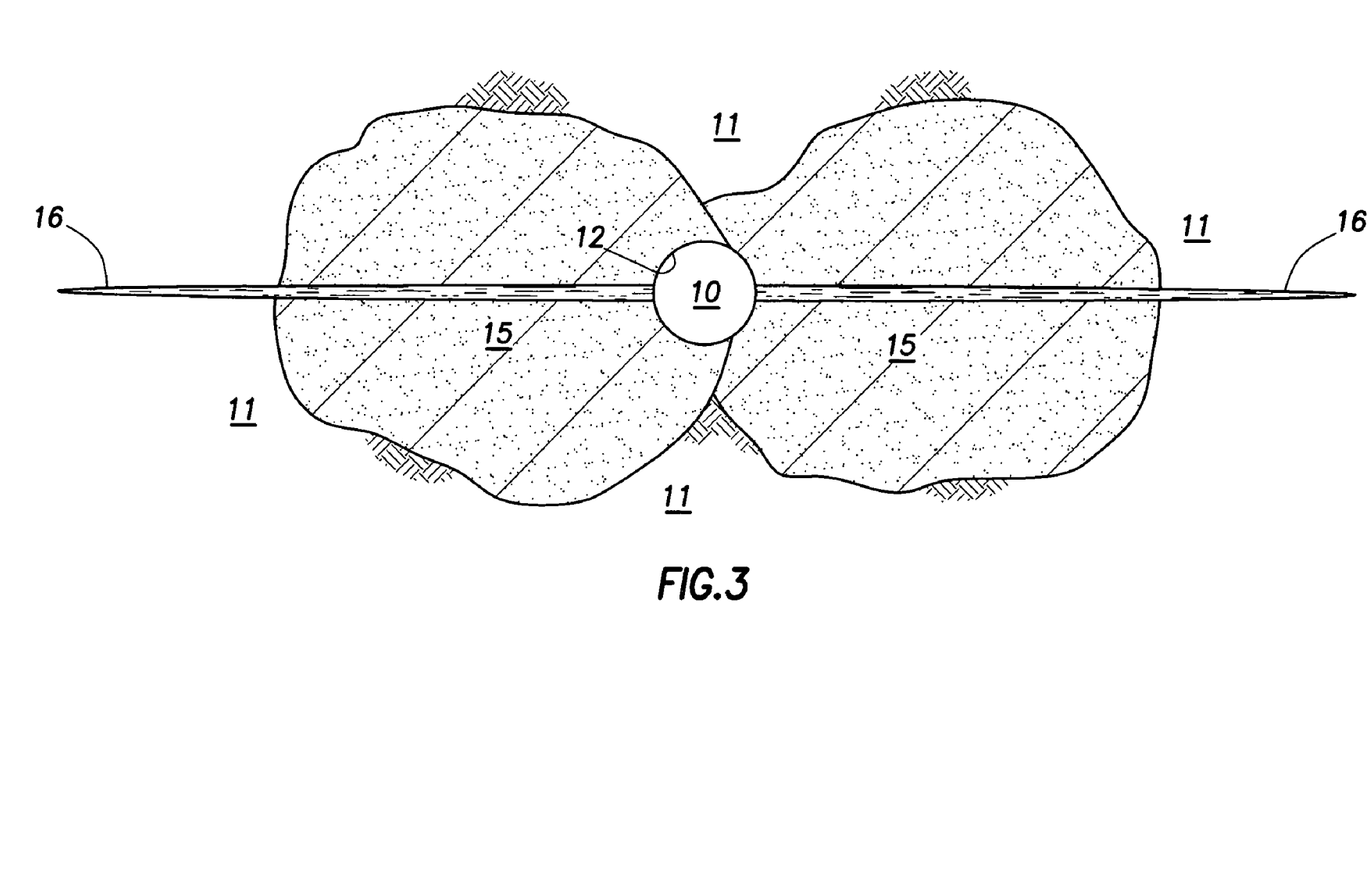
FIG. 3 shows a cross-sectional view of a subterranean formation penetrated by a well bore after a consolidating agent has been introduced and a fracture has been created in the subterranean formation according to one embodiment of the present invention.

After introducing the consolidating agent into at least one slot in the unconsolidated portion of the subterranean formation, at least one fracture is created or enhanced in the portion of the subterranean formation, among other purposes, to at least partially restore the permeability of the portion of the subterranean formation and reconnect the well bore with portions of the formation (e.g., the reservoir formation) outside the region that has been consolidated. "Enhancing" one or more fractures in a subterranean formation, as that term is used herein, refers to the extension or enlargement of one or more natural or previously created fractures in the subterranean formation. FIG. 3 illustrates a cross-sectional view of the well bore 10 depicted in FIGS. 1 and 2 after a fracture 16 as been created or enhanced in the portion of the subterranean formation where the consolidating agent 15 has been introduced. The creation or enhancement of at least one fracture in the subterranean formation may, among other things, restore the permeability of a portion of the subterranean formation that has been consolidated, and/or maintain the permeability of a portion of the subterranean formation that will become consolidated after a consolidating agent introduced therein has been allowed to fully cure and/or polymerize.

The fracturing step may be accomplished by any means known by a person skilled in the art for creating or enhancing one or more fractures in a subterranean formation. For example, a hydraulic fracturing treatment may be used wherein a fluid (e.g., a fracturing fluid) is introduced into the subterranean formation at a rate and/or pressure sufficient to create or enhance one or more fractures in the formation. In certain embodiments, the fluid used in the hydraulic fracturing treatment may comprise a viscosified fluid (e.g., a fluid comprising a gelling agent, a crosslinked gelling agent, a surfactant, or a combination thereof). In certain embodiments, a fluid comprising proppant particulates may be introduced into the subterranean formation, and the proppant particulates therein may be deposited in the fracture, among other purposes, to maintain fluid conductivity of the fracture. The proppant may be coated with a curable resin or consolidating agent, among other purposes, to form a hard, permeable solid mass in the fracture or fractures, among other things, to prevent proppant flow back during production from the well, and/or to enhance and maintain the conductivity of the propped fracture(s). The proppant also may be blended with fibrous particulates inter alia, to form a stable network with the proppant and also partially control proppant flow back.

In certain embodiments, a hydrajetting tool such as those described in U.S. Pat. Nos. 5,765,642, 5,494,103, and 5,361,856, 5,335,724, 5,547,023 the relevant portions of which are herein incorporated by reference, may be used to create or enhance one or more fractures in the subterranean formation. These fractures may, among other things, restore the permeability of a portion of the subterranean formation and/or expose some obstructed portion of the subterranean formation to the well bore. For example, a fluid (e.g., a liquid or a gas) may be introduced through the hydrajetting tool in such a way that creates or enhances one or more fractures in the formation. In certain embodiments, the hydrajetting tool may be capable of introducing the fluid into the formation at a rate and pressure sufficient to create or enhance one or more fractures in the formation. In certain embodiments, the fluid introduced with the hydrajetting tool may comprise abrasive materials (e.g., particulate materials such as sand, gravel, degradable particulates, and the like) that may, inter alia, facilitate the restoration of the permeability of a portion of the formation.

The step of creating or enhancing one or more fractures in the portion of the subterranean formation may be done at any point after introducing a consolidating agent into at least one slot in the unconsolidated portion of the subterranean formation. In certain embodiments, one or more fractures may be created or enhanced in the portion of the subterranean formation before the consolidating agent has least partially consolidated the unconsolidated portion of the subterranean formation (e.g., before the consolidating agent is allowed to fully cure and/or polymerize). In certain embodiments, one or more fractures may be created or enhanced in the portion of the subterranean formation after a "shut-in period" wherein the consolidating agent is allowed to cure and/or polymerize.

The methods of the present invention may be used to consolidate a single interval in an unconsolidated portion of a subterranean formation, or may be repeated to consolidate portions of the formation in several different intervals individually. In embodiments where several different intervals are treated, the several intervals may be penetrated by a single well bore, different contiguous well bores, or different well bores that are not contiguous.

The methods of the present invention may be used prior to, in combination with, or after any type of subterranean operation being performed in the subterranean formation, including but not limited to fracturing operations, gravel-packing operations, frac-packing operations (i.e., combination of fracturing and gravel-packing operations), and the like. For example, the methods of the present invention may be used at some time after a fracturing operation, wherein the methods of the present invention are used to at least partially consolidate proppant particulates placed within one or more fractures created or enhanced during the fracturing operation. In certain embodiments, the methods of the present invention optionally may comprise introducing other additives and treatment fluids, such as relative permeability modifiers, proppant, surfactants, gases, biocides, acids, or any other suitable additives or treatment fluids, into the subterranean formation through the dynamic diversion tool and/or by any other means suitable for introducing those additives or treatment fluids into the subterranean formation.

II. Fluids

The preflush fluids used in certain embodiments of the present invention may include any fluid that does not adversely interact with the other components used in accordance with this invention (e.g., the consolidating agent) or with the subterranean formation. For example, the preflush fluid may be an aqueous-based liquid, a hydrocarbon-based liquid (e.g., kerosene, xylene, toluene, diesel, oils, esters, etc.), a foamed fluid (e.g., a liquid that comprises a gas), or a gas (e.g., nitrogen or carbon dioxide). Aqueous-based fluids may comprise fresh water, salt water, brine, or seawater, or any other aqueous fluid that does not adversely react with the other components used in accordance with this invention or with the subterranean formation. In certain embodiments, an aqueous-based preflush may comprise a surfactant. Any surfactant compatible with later-used treatments (e.g., the consolidating agent) may be used in the present invention, for example, to aid a consolidating agent in flowing to the contact points between adjacent particulates in the formation. Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773, the relevant disclosure of which is incorporated herein by reference. A $C_{12}$-$C_{22}$ alkyl phosphonate surfactant is preferred. The surfactant or surfactants used may be included in the preflush fluid in an amount sufficient to prepare the subterranean formation to receive a treatment of a consolidating agent. In some embodiments of the present invention, the surfactant is present in the preflush fluid in an amount in the range of from about 0.1% to about 3% by weight of the aqueous fluid.

The fracturing fluids used in certain embodiments of the present invention may include any fluid that does not adversely interact with the other components used in accordance with this invention or with the subterranean formation. For example, the fracturing fluid may be an aqueous-based liquid, a hydrocarbon-based liquid (e.g., kerosene, xylene, toluene, diesel, oils, etc.), a viscoelastic surfactant fluid, a foamed fluid (e.g., a liquid that comprises a gas), or a gas (e.g., nitrogen or carbon dioxide). Aqueous-based fluids may comprise fresh water, salt water, brine, or seawater, or any other aqueous fluid that does not adversely react with the other components used in accordance with this invention (e.g., the consolidating agent) or with the subterranean formation.

The preflush fluids and/or fracturing fluids used in methods of the present invention may comprise any number of additional additives, including, but not limited to, salts, surfactants, acids, fluid loss control additives, gas, foamers, emulsifiers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, particulate materials (e.g., proppant particulates) and the like. In certain embodiments, the preflush fluids and/or fracturing fluids may comprise an activator or catalyst which may be used, inter alia, to activate the polymerization of the consolidating agent. A person skilled in the art, with the benefit of this disclosure, will recognize the types of additives that may be included in the preflush fluids and/or fracturing fluids for a particular application.

III. Consolidating Agents

Suitable consolidating agents for the methods at the present invention include any composition that may stabilize a portion of the subterranean formation, which may, at least in part, stabilize unconsolidated particulates such that they are prevented from shifting or migrating. Examples of suitable consolidating agents include resins, tackifying agents, and gelable liquid compositions.

A. Resins

Resins suitable for use as the consolidating agents in the methods of the present invention include any suitable resin that is capable of forming a hardened, consolidated mass. The term "resin" as used herein includes any of numerous physically similar polymerized synthetics or chemically modified natural resins, including but not limited to thermoplastic materials and thermosetting materials. Many such resins are commonly used in subterranean consolidation operations, and some suitable resins include two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins, may be formulated to cure at a delayed rate, or require a time-delayed catalyst or an external catalyst to help activate the polymerization of the resins if the cure temperature is low (i.e., less than 250° F.) but will cure under the effect of time and temperature if the formation temperature is above about 250° F., preferably above about 300° F. Such external catalysts may be introduced into the subterranean formation by any suitable means. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300° F. to about 600° F., a furan-based resin may be preferred. For subterranean formations having a BHST ranging from about 200° F. to about 400° F., either a phenolic-based resin or a multi-functional, high performance epoxy-based resin may be suitable. For subterranean formations having a BHST of at least about 175° F., a phenol/phenol formaldehyde/furfuryl alcohol resin may also be suitable.

Any solvent that is compatible with the chosen resin and achieves the desired viscosity effect is suitable for use in the present invention. Some preferred solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d-limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, hexoxyethanol, and isomers thereof. Selection of an appropriate solvent is dependent on the resin chosen and is within the ability of one skilled in the art with the benefit of this disclosure.

B. Tackifying Agents

Tackifying agents suitable for use in the methods of the present invention exhibit a sticky character and, thus, impart a degree of consolidation to unconsolidated particulates in the subterranean formation. The term "tackifying agent" is defined herein to include any composition having a nature such that it is (or may be activated to become) somewhat sticky to the touch. In certain embodiments, the tackifying agent may be formulated such that it is "activated" at a delayed rate, by contact with a catalyst or activator, or at certain conditions (e.g., temperature). Examples of suitable tackifying agents suitable for use in the present invention include non-aqueous tackifying agents, aqueous tackifying agents, and silyl-modified polyamides.

One type of tackifying agent suitable for use in the present invention is a non-aqueous tackifying agent. An example of a suitable tackifying agent may comprise polyamides that are liquids or in solution at the temperature of the subterranean formation such that they are, by themselves, non-hardening when introduced into the subterranean formation. One example of such a tackifying agent comprises a condensation reaction product comprised of commercially available polyacids and a polyamine. Suitable commercial products include compounds such as mixtures of $C_{36}$ dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as non-aqueous tackifying agents include liquids and solutions of, for example, polyesters, polycarbonates and polycarbamates, natural resins such as shellac and the like. Other suitable non-aqueous tackifying agents are described in U.S. Pat. Nos. 5,853,048 and 5,833,000, the relevant disclosures of which are herein incorporated by reference.

Non-aqueous tackifying agents suitable for use in the present invention may be either used such that they form a non-hardening coating, or they may be combined with a multifunctional material capable of reacting with the non-aqueous tackifying agent to form a hardened coating. A "hardened coating," as used herein, means that the reaction of the tackifying agent with the multifunctional material will result in a substantially non-flowable reaction product that exhibits a higher compressive strength in a consolidated agglomerate than the tackifying agent alone with the particulates. In this instance, the non-aqueous tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfuraldehyde, glutaraldehyde or aldehyde condensates and the like, and combinations thereof. In some embodiments of the present invention, the multifunctional material may be mixed with the tackifying agent in an amount of from about 0.01 to about 50 percent by weight of the tackifying agent to effect formation of the reaction product. In some preferable embodiments, the multifunctional material is present in an amount of from about 0.5 to about 1 percent by weight of the tackifying compound. Suitable multifunctional materials are described in U.S. Pat. No. 5,839,510, the relevant disclosure of which is herein incorporated by reference.

Solvents suitable for use with non-aqueous tackifying agents include any solvent that is compatible with the non-aqueous tackifying agent and achieves the desired viscosity effect. The solvents that can be used in the present invention preferably include but are not limited to, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d-limonene, 2-butoxy ethanol, butyl acetate, furfuryl acetate, butyl lactate, dimethyl sulfoxide, dimethyl formamide, fatty acid methyl esters, and combinations thereof. It is within the ability of one skilled in the art, with the benefit of this disclosure, to determine whether a solvent is needed to achieve a viscosity suitable to the subterranean conditions and, if so, how much.

Aqueous tackifying agents suitable for use in the present invention are not significantly tacky when placed onto a particulate, but are capable of being "activated" (e.g., destabilized, coalesced, and/or reacted) to transform the compound into a sticky, tackifying compound at a desirable time. Such activation may occur before, during, or after the aqueous tackifier agent is placed in the subterranean formation. In some embodiments, a pretreatment may be first contacted with the surface of a particulate to prepare it to be coated with an aqueous tackifying agent. Suitable aqueous tackifying agents are generally charged polymers that comprise compounds that, when in an aqueous solvent or solution, will form a non-hardening coating (by itself or with an activator and/or catalyst) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a cohesive, flexible, and permeable mass. When used, the activator and/or catalyst may be a component of a treatment fluid comprising the aqueous tackifying agent, or may be introduced into the subterranean formation separately by any suitable means.

Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), poly(butyl methacrylate), and poly(2-ethylhexyl methacryate)), acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate co-polymers, and combinations thereof. The term "derivative" is defined herein to include any compound that is made from one of the listed compounds, for example, by replacing one atom in one of the listed compounds with another atom or group of atoms, ionizing one of the listed compounds, or creating a salt of one of the listed compounds. Methods of determining suitable aqueous tackifying agents and additional disclosure on aqueous tackifying agents can be found in U.S. Patent Application Publication 2005/0277554 A1, published Dec. 15, 2005, and U.S. Patent Application Publication 2005/0274517 A1 (now U.S. Pat. No. 7,131,491), published Dec. 15, 2005, the relevant disclosures of which are hereby incorporated by reference.

Silyl-modified polyamide compounds suitable for use in the tackifying agents in the methods of the present invention may be described as substantially self-hardening compositions that are capable of at least partially adhering to particulates in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a mixture of polyamides. The polyamide or mixture of polyamides may be one or more polyamide intermediate compounds obtained, for example, from the reaction of a polyacid (e.g., diacid or higher) with a polyamine (e.g., diamine or higher) to form a polyamide polymer with the elimination of water. Other suitable silyl-modified polyamides and methods of making such compounds are described in U.S. Pat. No. 6,439,309, the relevant disclosure of which is herein incorporated by reference.

Some suitable tackifying agents are described in U.S. Pat. No. 5,249,627 by Harms, et al., the relevant disclosure of which is incorporated by reference. Harms discloses aqueous tackifying agents that comprise at least one member selected from the group consisting of benzyl coco di-(hydroxyethyl) quaternary amine, p-T-amyl-phenol condensed with formaldehyde, and a copolymer comprising from about 80% to about 100% $C_{1-30}$ alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. Suitable hydrophillic monomers may be any monomer that will provide polar oxygen-containing or nitrogen-containing groups. Suitable hydrophillic monomers include dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or preferably acrylic acid, hydroxyethyl acrylate, acrylamide, and the like. These copolymers can be made by any suitable emulsion polymerization technique. Methods of producing these copolymers are disclosed, for example, in U.S. Pat. No. 4,670,501, the relevant disclosure of which is incorporated herein by reference.

C. Gelable Liquid Compositions

Gelable liquid compositions suitable for use in the methods of the present invention may comprise any gelable liquid composition capable of converting into a gelled substance capable of substantially plugging the permeability of the formation while allowing the formation to remain flexible. That is, the gelled substance should negatively impact the ability of the formation to produce desirable fluids such as hydrocarbons. As discussed above, the permeability of the formation may be restored by fracturing through the consolidated portion. As referred to herein, the term "flexible" refers to a state wherein the treated formation or material is relatively malleable and elastic and able to withstand substantial pressure cycling without substantial breakdown. Thus, the resultant gelled substance should be a semi-solid, immovable, gel-like substance, which, among other things, stabilizes the treated portion of the formation while allowing the formation to absorb the stresses created during pressure cycling. As a result, the gelled substance may aid in preventing breakdown of the formation both by stabilizing and by adding flexibility to the formation sands. Examples of suitable gelable liquid compositions include, but are not limited to, resin compositions that cure to form flexible gels, gelable aqueous silicate compositions, crosslinkable aqueous polymer compositions, and polymerizable organic monomer compositions.

Certain embodiments of the gelable liquid compositions comprise curable resin compositions. Curable resin compositions are well known to those skilled in the art and have been used to consolidate portions of unconsolidated formations and to consolidate proppant materials into hard, permeable masses. While the curable resin compositions used in accordance with the present invention may be similar to those previously used to consolidate sand and proppant into hard, permeable masses, they are distinct in that resins suitable for use with the present invention do not cure into hard, permeable masses; rather they cure into flexible, gelled substances. That is, suitable curable resin compositions form resilient gelled substances between the particulates of the treated portion of the unconsolidated formation and thus allow that portion of the formation to remain flexible and to resist breakdown. It is not necessary or desirable for the cured resin composition to solidify and harden to provide high consolidation strength to the treated portion of the formation. On the contrary, upon being cured, the curable resin compositions useful in accordance with this invention form semi-solid, immovable, gelled substances.

Generally, the curable resin compositions useful in accordance with the present invention may comprise a curable resin, a diluent, and a resin curing agent. When certain resin curing agents, such as polyamides, are used in the curable resin compositions, the compositions form the semi-solid, immovable, gelled substances described above. Where the resin curing agent used may cause the organic resin compositions to form hard, brittle material rather than a desired gelled substance, the curable resin compositions may further comprise one or more "flexibilizer additives" (described in more detail below) to provide flexibility to the cured compositions.

Examples of curable resins that can be used in the curable resin compositions of the present invention include, but are not limited to, organic resins such as polyepoxide resins (e.g., bisphenol A-epichlorihydrin resins), polyester resins, urea-aldehyde resins, furan resins, urethane resins, and mixtures thereof. Of these, polyepoxide resins are preferred.

Any diluent that is compatible with the curable resin and achieves the desired viscosity effect is suitable for use in the present invention. Examples of diluents that may be used in the curable resin compositions of the present invention include, but are not limited to, phenols, formaldehydes, furfuryl alcohols, furfurals, alcohols, ethers (e.g., butyl glycidyl ether and cresyl glycidyl etherphenyl glycidyl ether), and mixtures thereof. In some embodiments of the present invention, the diluent comprises butyl lactate. The diluent may be used to reduce the viscosity of the curable resin composition to from about 3 to about 3,000 centipoises ("cP") at 80° F. Among other things, the diluent acts to provide flexibility to the cured composition. The diluent may be included in the curable resin composition in an amount sufficient to provide the desired viscosity effect. Generally, the diluent used is included in the curable resin composition in amount in the range of from about 5% to about 75% by weight of the curable resin.

Generally, any resin curing agent that may be used to cure an organic resin is suitable for use in the present invention. When the resin curing agent chosen is an amide or a polyamide, generally no flexibilizer additive will be required because, inter alia, such curing agents cause the curable resin composition to convert into a semi-solid, immovable, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the curable resin composition, whether a flexibilizer additive is included or not, in an amount in the range of from about 5% to about 75% by weight of the curable resin. In some embodiments of the present invention, the resin curing agent used is included in the curable resin composition in an amount in the range of from about 20% to about 75% by weight of the curable resin.

As noted above, flexibilizer additives may be used, inter alia, to provide flexibility to the gelled substances formed from the curable resin compositions. The term "flexibilizer additive" is defined herein to include any substance that is capable of imparting properties of flexibility (e.g., malleability, elasticity) to the substances formed from the curable resin compositions. Flexibilizer additives should be used where the resin curing agent chosen would cause the organic resin composition to cure into a hard and brittle material instead of desired gelled substances described herein. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof. Of these, ethers, such as dibutyl phthalate, are preferred. Where used, the flexibilizer additive may be included in the curable resin composition in an amount in the range of from about 5% to about 80% by weight of the curable resin. In some embodiments of the present invention, the flexibilizer additive may be included in the curable resin composition in an amount in the range of from about 20% to about 45% by weight of the curable resin.

In other embodiments, the gelable liquid compositions may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprises an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used, inter alia, to convert the gelable aqueous silicate compositions into the desired semi-solid, immovable, gelled substance described above. Selection of a temperature-activated catalyst is related, at least in part, to the temperature of the subterranean formation to which the gelable aqueous silicate composition will be introduced. The temperature-activated catalysts which can be used in the gelable aqueous silicate compositions of the present invention include, but are not limited to, ammonium sulfate, which is most suitable in the range of from about 60° F. to about 240° F.; sodium acid pyrophosphate, which is most suitable in the range of from about 60° F. to about 240° F.; citric acid, which is most suitable in the range of from about 60° F. to about 120° F.; and ethyl acetate, which is most suitable in the range of from about 60° F. to about 120° F. Generally, the temperature-activated catalyst is present in the range of from about 0.1% to about 5% by weight of the gelable aqueous silicate composition. When used, the temperature-activated catalyst may be a component of a treatment fluid comprising the gelable acqueous silicate composition, or may be introduced into the subterranean formation separately by any suitable means.

In other embodiments, the gelable liquid compositions may comprise crosslinkable aqueous polymer compositions. Generally, suitable crosslinkable aqueous polymer compositions may comprise an aqueous solvent, a crosslinkable polymer, and a crosslinking agent.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions of the present invention may further comprise a crosslinking agent for crosslinking the crosslinkable polymers to form the desired gelled substance. In some embodiments, the crosslinking agent may be a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of the present invention in an amount sufficient to provide, inter alia, the desired degree of crosslinking. In some embodiments of the present invention, the crosslinking agent is present in the crosslinkable aqueous polymer compositions of the present invention in an amount in the range of from 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agents derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

In other embodiments, the gelled liquid compositions may comprise polymerizable organic monomer compositions. Generally, suitable polymerizable organic monomer compositions may comprise an aqueous-base fluid, a water-soluble polymerizable organic monomer, an oxygen scavenger, and a primary initiator.

The aqueous-base fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidepropyltriethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer(s) are included in the polymerizable organic monomer composition in an amount in the range of from about 1% to about 30% by weight of the aqueous-base fluid. In another embodiment of the present invention, the water-soluble polymerizable organic monomer(s) are included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used, inter alia, to initiate polymerization of the water-soluble polymerizable organic monomer(s) used in the present invention. Any compound or compounds which form free radicals in aqueous solution may be used as the primary initiator. The free radicals act, inter alia, to initiate polymerization of the water-soluble polymerizable organic monomer(s) present in the polymerizable organic monomer composition. Compounds suitable for use as the primary initiator include, but are not limited to, alkali metal persulfates, peroxides, oxidation-reduction systems employing reducing agents, (e.g., sulfites in combination with oxidizers, and azo polymerization initiators. Preferred azo polymerization initiators include 2,2'-azobis(2-imidazole-2-hydroxyethyl) propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s).

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Optionally, the polymerizable organic monomer compositions of the present invention further may comprise a crosslinking agent for crosslinking the polymerizable organic monomer compositions in the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

Therefore, the present invention is well adapted to attain the ends and advantages mentioned as well as those that are inherent therein. While numerous changes may be made by those skilled in the art, such changes are encompassed within the spirit of this invention as defined by the appended claims. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the appended claims have their plain, ordinary meaning unless otherwise explicitly and clearly defined by the patentee.

What is claimed is:

1. A method comprising:
   creating or enhancing at least two slots in an unconsolidated portion of a subterranean formation along a well bore, wherein the slots penetrate the subterranean formation in a direction approximately parallel to the direction of maximum horizontal stress of the unconsolidated portion of the subterranean formation and are positioned about 180 degrees from each other along the inner surface of the well bore;
   introducing a consolidating agent into the slots in the unconsolidated portion of the subterranean formation, wherein the consolidating agent comprises at least one consolidating agent selected from the group consisting of: a tackifying agent, an aqueous crosslinkable gel composition, a gelable aqueous silicate composition, a polymerizable organic monomer composition, and any mixture thereof; and
   creating or enhancing at least one fracture in a portion of the subterranean formation before the consolidating agent is permitted to cure.

2. The method of claim 1 wherein the consolidating agent comprises at least one polymerizable organic monomer selected from the group consisting of hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and any mixture thereof.

3. The method of claim 1 wherein creating or enhancing at least one slot in an unconsolidated portion of a subterranean formation along a well bore comprises hydrajetting at least one slot in an unconsolidated portion of a subterranean formation along a well bore.

4. The method of claim 1 wherein the slot comprises a length of at least about 1 inch.

5. The method of claim 1 wherein the slot comprises a width in the range of from about 0.25 inches to about 1 inch.

6. The method of claim 1 further comprising isolating a region of the well bore adjacent to the unconsolidated portion of the subterranean formation.

7. The method of claim 1 further comprising introducing a preflush fluid into the subterranean formation.

8. The method of claim 1 wherein creating or enhancing at least one fracture in the portion of the subterranean formation comprises using a hydrajetting technique to create or enhance at least one fracture in the portion of the subterranean formation.

9. The method of claim 1 wherein the well bore is an uncased well bore.

10. The method of claim 1 wherein the consolidating agent comprises at least one consolidating agent selected from the group consisting of: a non-aqueous tackifying agent; an aqueous tackifying agent, a silyl-modified polyamide; a gelable aqueous silicate composition; a crosslinkable aqueous polymer composition; a polymerizable organic monomer composition; and any combination thereof.

11. A method comprising:

introducing a consolidating agent into at least two preformed slots in an unconsolidated portion of a subterranean formation along a well bore, wherein the slots penetrate the subterranean formation in a direction approximately parallel to the direction of maximum horizontal stress of the unconsolidated portion of the subterranean formation and are positioned about 180 degrees from each other along the inner surface of the well bore; and introducing a consolidating agent into the slots in the unconsolidated portion of the subterranean formation;

wherein the consolidating agent comprises at least one consolidating agent selected from the group consisting of: a non-aqueous tackifying agent; an aqueous tackifying agent, a silyl-modified polyamide; a gelable aqueous silicate composition; and any combination thereof; and creating or enhancing at least one fracture in a portion of the subterranean formation.

12. The method of claim 11 wherein the well bore is an uncased well bore.

13. The method of claim 11 further comprising isolating a region of the well bore adjacent to the unconsolidated portion of the subterranean formation.

14. The method of claim 11 wherein the consolidating agent further comprises at least one element selected from the group consisting of: a crosslinking agent; an oxygen scavenger; a primary initiator; a secondary initiator; and any combination thereof.

15. The method of claim 11 wherein the step of creating or enhancing at least one fracture in a portion of the subterranean formation is performed before the consolidating agent is permitted to cure.

* * * * *